US012070129B2

(12) United States Patent
Tompkin et al.

(10) Patent No.: US 12,070,129 B2
(45) Date of Patent: Aug. 27, 2024

(54) REVERSIBLE OTTOMAN

(71) Applicant: MerchSource, LLC, Irvine, CA (US)

(72) Inventors: Pip Tompkin, Irvine, CA (US); Daniel Levi Ballou, Long Beach, CA (US)

(73) Assignee: MerchSource, LLC, Irvine, CA (US)

( * ) Notice: Subject to any disclaimer, the term of this patent is extended or adjusted under 35 U.S.C. 154(b) by 719 days.

(21) Appl. No.: 17/142,483

(22) Filed: Jan. 6, 2021

(65) Prior Publication Data

US 2022/0211184 A1 Jul. 7, 2022

(51) Int. Cl.

*A61H 23/02* (2006.01)
*A47C 16/02* (2006.01)
*A61H 9/00* (2006.01)

(52) U.S. Cl.

CPC ........... *A47C 16/02* (2013.01); *A61H 9/0078* (2013.01); *A61H 23/02* (2013.01); *A61H 2201/0138* (2013.01); *A61H 2201/0207* (2013.01); *A61H 2201/164* (2013.01)

(58) Field of Classification Search

CPC ...... A47C 16/02; A61H 9/0078; A61H 23/02; A61H 2201/0138; A61H 2201/0207; A61H 2201/164; A61H 2201/1642; A61H 9/00; A61H 9/0007; A61H 9/005; A61H 2201/5043; A61H 2201/5046; A61H 2201/50

See application file for complete search history.

(56) References Cited

U.S. PATENT DOCUMENTS 978,037 A * 12/1910 Klausman ............... A47L 23/16 15/265
2,742,037 A * 4/1956 Svoren ............... A61H 23/0218 601/57

(Continued)

FOREIGN PATENT DOCUMENTS

KR 20170036998 A * 9/2015 ............... A47C 1/00
KR 1636329 B1 * 7/2016 ............. A61B 5/053

(Continued)

OTHER PUBLICATIONS

Machine translation of written description and claims for KR101636329B1 provided by espacenet. (Year: 2016).*

(Continued)

*Primary Examiner* — Michael R Reid
*Assistant Examiner* — Tyler A Raubenstraw
(74) *Attorney, Agent, or Firm* — Renner, Otto, Boisselle & Sklar, LLP

(57) ABSTRACT

An ottoman includes a support base, a reversible footrest that is removably supported in the support base and houses an electrically powered massager, and a compression band that is attached to the reversible footrest and extends over a top or bottom side of the reversible footrest, with the compression band being configured to compress a foot or feet of a user between the compression band and the reversible footrest. The reversible footrest has a first orientation in which the compression band is exposed outside the support base and a second orientation in which the compression band is stowed in the support base. The electrically powered massager is operable when the reversible footrest is in both the first orientation and in the second orientation.

20 Claims, 4 Drawing Sheets

(56) References Cited

U.S. PATENT DOCUMENTS

| | | | | | |
|---|---|---|---|---|---|
| 2,934,062 | A * | 4/1960 | Klassen | A61H 23/02 | 601/61 |
| 3,322,117 | A * | 5/1967 | Mccaw | A61H 23/0254 | 601/87 |
| 4,086,921 | A * | 5/1978 | Gonzales | A61H 23/02 | 601/22 |
| 4,218,093 | A * | 8/1980 | Gertz | A47C 16/025 | 482/148 |
| 4,513,736 | A * | 4/1985 | Thurber | A61H 23/0218 | 601/57 |
| 5,573,500 | A * | 11/1996 | Katsunuma | A61H 23/0254 | 601/134 |
| 5,797,859 | A * | 8/1998 | Prehodka | A61H 7/004 | 601/87 |
| 6,780,142 | B1 * | 8/2004 | Takizawa | A63B 22/203 | 482/8 |
| 7,669,934 | B1 * | 3/2010 | Cline | A47C 16/025 | 297/423.46 |
| 7,681,945 | B1 * | 3/2010 | Wiecek | A47C 13/00 | 297/118 |
| 9,216,134 | B2 * | 12/2015 | Inada | A61H 7/004 | |
| 9,226,586 | B1 * | 1/2016 | Reid | A47C 16/02 | |
| 9,717,340 | B2 * | 8/2017 | Rivera | A47C 16/025 | |
| 11,130,578 | B1 * | 9/2021 | Dowty | B64D 11/06 | |
| 2002/0091344 | A1 * | 7/2002 | Thomas | A61H 9/0078 | 601/136 |
| 2003/0006639 | A1 * | 1/2003 | Shimizu | B60N 3/06 | 297/466 |
| 2003/0045817 | A1 * | 3/2003 | Suh | A61H 15/0078 | 601/102 |
| 2004/0082886 | A1 * | 4/2004 | Timpson | A61H 23/02 | 601/46 |
| 2004/0193078 | A1 * | 9/2004 | Flick | A61H 23/02 | 601/61 |
| 2010/0042028 | A1 * | 2/2010 | Frank | A61H 9/0078 | 601/151 |
| 2010/0222722 | A1 * | 9/2010 | Leismer | A61H 23/0254 | 601/49 |
| 2012/0203150 | A1 * | 8/2012 | Eberhardt | A61H 1/005 | 601/55 |
| 2015/0173505 | A1 * | 6/2015 | Mirth | A47B 17/00 | 211/186 |
| 2015/0366746 | A1 * | 12/2015 | Ashby | G16H 40/63 | 601/49 |
| 2016/0000630 | A1 * | 1/2016 | Purdy | A61H 9/0078 | 128/845 |
| 2016/0051400 | A1 * | 2/2016 | Ruetenik | A61F 7/103 | 601/15 |
| 2016/0374892 | A1 * | 12/2016 | Drey | A61H 9/005 | 601/151 |
| 2017/0333281 | A1 * | 11/2017 | Frank | A61F 13/064 | |
| 2017/0347897 | A1 * | 12/2017 | Ji | A61B 5/0225 | |
| 2019/0224031 | A1 * | 7/2019 | Dunca | A63B 21/0421 | |
| 2020/0154895 | A1 * | 5/2020 | Oh | A47C 7/742 | |
| 2020/0315905 | A1 * | 10/2020 | Rizzo | A61H 1/00 | |
| 2020/0390640 | A1 * | 12/2020 | Furutani | A61H 23/02 | |

FOREIGN PATENT DOCUMENTS

| | | | | | |
|---|---|---|---|---|---|
| WO | WO-2006033238 | A1 * | 3/2006 | A61H 23/02 |
| WO | WO-2016169070 | A1 * | 10/2016 | A61H 1/02 |

OTHER PUBLICATIONS

Machine translation of written description and claims for KR20170036998B1 provided by espacenet. (Year: 2015).*

Machine translation of written description and claims for WO2006033238A1 (Year: 2006).*

Machine translation of written description and claims for WO2016169070A1 (Year: 2016).*

* cited by examiner

REVERSIBLE OTTOMAN

TECHNICAL FIELD

The present disclosure relates to an ottoman that includes a foot massager.

BACKGROUND

Massaging systems may be provided in different forms, such as in handheld devices or in chairs. However, handheld devices may not be aesthetically pleasing and require storage when not in use. Chairs that incorporate a massaging system may enable built-in storage of the massaging system in contrast to a handheld device, but the treated areas of the body provided by a chair massager are limited.

SUMMARY

The present application provides an ottoman that includes a reversible footrest having an electrically powered massager. The reversible footrest includes a compression band having an expandable bladder that is configured to compress the feet of a user. When the reversible footrest is in a first orientation, the compression band is exposed and operable for use. The reversible footrest is configured to be flipped by 180 degrees to a second orientation in which the compression band is stowed in a support base that supports the reversible footrest in both orientations. The electrically powered massager is operable in both orientations. The support base defines an interior cavity that is configured to receive at least a portion of the reversible footrest. The height of the interior cavity is greater than the height of the compression band to accommodate the compression band when in the stowed position.

The height of the compression band may be adjustable via a center post that extends from the reversible footrest to the compression band. The electrically powered massager may include a heater and vibration device. An elongated through-slot may be formed in a sidewall of the reversible footrest for routing a power connector that is connectable to the electrically powered massager. Advantageously, the elongated through-slot is formed to enable the power connector to extend out of the reversible footrest when the reversible footrest is in either the first orientation in which the compression band is exposed or in the second orientation in which the compression band is stowed.

The ottoman may include hidden control buttons for operating the electrically powered massager that are enclosed and accessible from outside the reversible footrest. The compression band may include a user interface and the user interface may include an electronic ink interface. In exemplary embodiments, the compression band may include a magnet that is configured to attract another magnet of a remote control. The interior cavity of the support base may define a groove configured to support the remote control within the interior cavity adjacent the reversible footrest.

According to an aspect of the disclosure, an ottoman may include a reversible footrest.

According to an aspect of the disclosure, a reversible footrest may include an electrically powered massager having a heater and a vibration device.

According to an aspect of the disclosure, an ottoman may include a compression band having an expandable or inflatable bladder.

According to an aspect of the disclosure, an ottoman may include a footrest having a compression band and a support base that is configured to stow the compression band.

According to an aspect of the disclosure, an ottoman may include hidden buttons that are enclosed in a reversible footrest and accessible from outside the reversible footrest.

According to an aspect of the disclosure, an ottoman may include a reversible footrest having a compression band with an adjustable height.

According to an aspect of the disclosure, an ottoman may include a reversible footrest having an electronic ink display.

According to an aspect of the disclosure, an ottoman may include a support base, a reversible footrest that is removably supported in the support base and contains an electrically powered massager, and a compression band that is attached to the reversible footrest and extends over a top or bottom side of the reversible footrest, with the compression band being configured to compress a foot or feet of a user between the compression band and the reversible footrest.

According to an aspect of the disclosure, a method of assembling an ottoman may include arranging an electrically powered massager in a reversible footrest, attaching a compression band to a top or bottom side of the reversible footrest, with the compression band extending over the top or bottom side of the reversible footrest and being configured to compress a foot or feet of a user between the compression band and the reversible footrest, and removably inserting the reversible footrest into a support base in either a first orientation in which the compression band is exposed outside the support base or a second orientation in which the compression band is stowed in the support base, the electrically powered massager being operable when the reversible footrest is in both the first orientation and in the second orientation.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

DETAILED DESCRIPTION

Figure 1:
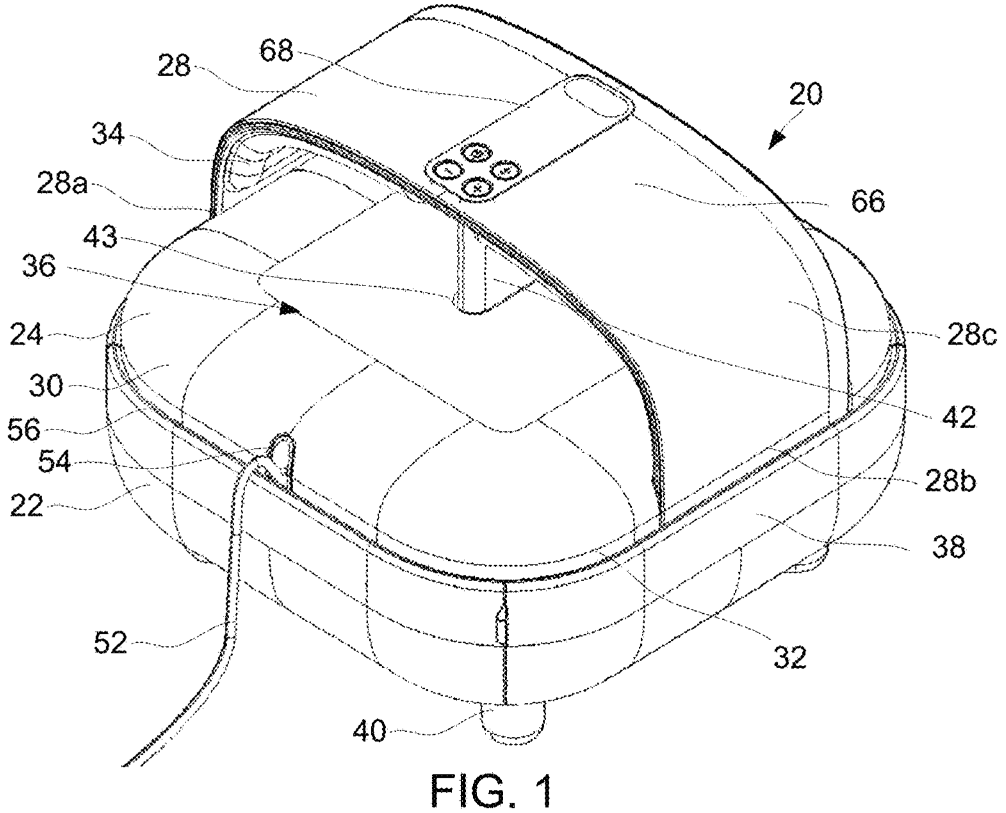
FIG. 1 shows a top oblique view of an ottoman according to an embodiment of the present application.
Figure 2:
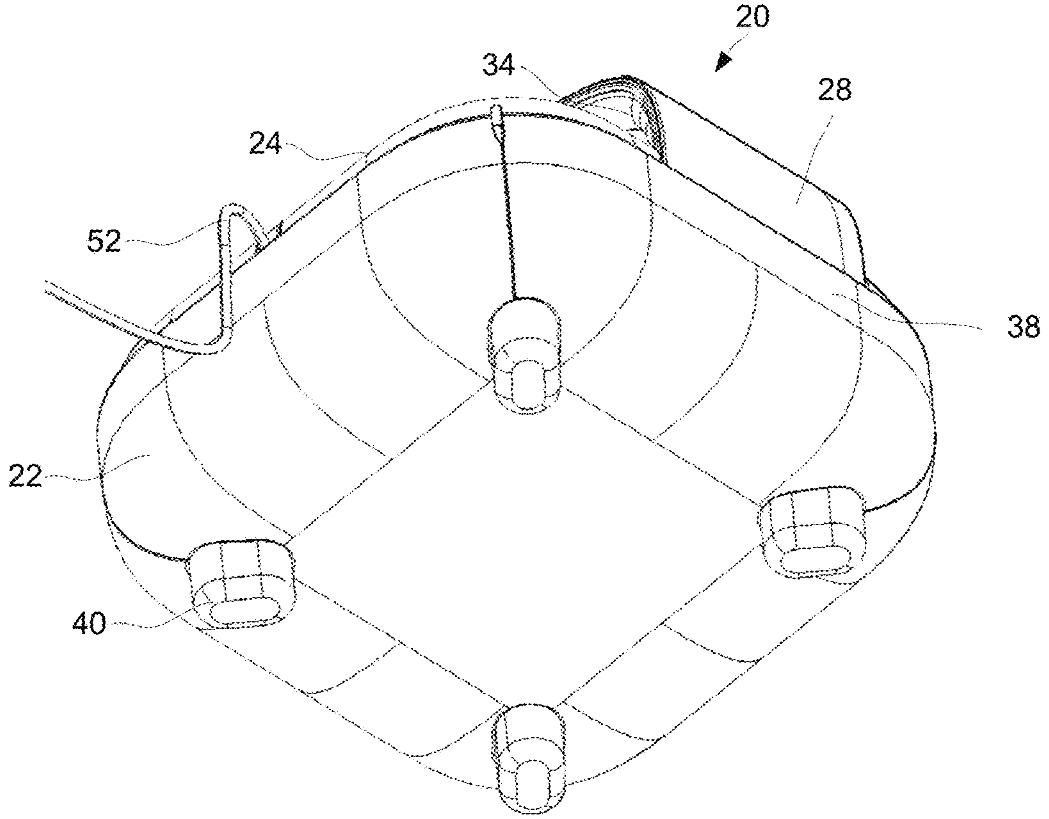
FIG. 2 shows a bottom oblique view of the ottoman of FIG. 1.

Aspects of the present application pertain to furniture that is configured to include massaging devices and systems. The principles described herein may be implemented in an ottoman, footrest, footstool, hassock, etc. Other types of furniture may also be suitable. In exemplary applications, the support base and the reversible footrest described herein may be arranged as part of a couch, sofa, chair, recliner, etc.

FIGS. 1-4 show an ottoman 20 including a support base 22 and a reversible footrest 24 that is removably supported in the support base 22. The reversible footrest 24 contains or houses an electrically powered massager that is enclosed by the reversible footrest 24. A compression band 28 is attached to the reversible footrest 24 and extends over a first side 30 of the reversible footrest 24. The compression band 28 is configured to receive the feet of a user under the compression band 28, such that the user inserts his or her feet between the reversible footrest 24 and the compression band 28. The first side 30 of the reversible footrest 24 may be a top or bottom side of the reversible footrest 24, depending on the orientation of the reversible footrest 24. When the reversible footrest 24 is in a first orientation, as shown in FIGS. 1-4, the first side 30 is a top side of the reversible footrest 24. When the reversible footrest 24 is in the first orientation, the compression band 28 is exposed and operable. The reversible footrest 24 may be flipped 180 degrees to a second orientation, such that the first side 30 is a bottom side of the reversible footrest 24 and the compression band 28 is stowed in the support base 22.

The compression band 28 has two opposite ends 28*a*, 28*b*, and a bridge portion 28*c* that extends between the opposite ends 28*a*, 28*b*. The bridge portion 28*c* is spaced from the first side 30 of the reversible footrest 24 and may have a curved or arcuate shape. Other shapes, such as rectangular, may also be suitable for the compression band 28. The opposite ends 28*a*, 28*b* of the compression band 28 may be attached to sidewalls 32 of the reversible footrest 24 which extend around the reversible footrest 24. The opposite ends 28*a*, 28*b* may extend upwardly in a vertical direction along the sidewalls 32.

The compression band 28 includes an inflatable or expandable bladder 34 disposed along a side of the compression band 28 that faces the first side 30 of the reversible footrest 24. An entire surface of the compression band 28 may be covered by the expandable bladder 34. The expandable bladder 34 may be inflated and filled with fluid, such as air, to expand and compress the feet of the user arranged between the reversible footrest 24 and the compression band 28. When not in use or when the compression band 28 is stowed in the support base 22, the expandable bladder 34 is deflated. The expandable bladder 34 may be formed of any suitable material. In an exemplary embodiment, the expandable bladder 34 may be formed of a polyurethane fabric material.

Figure 3:
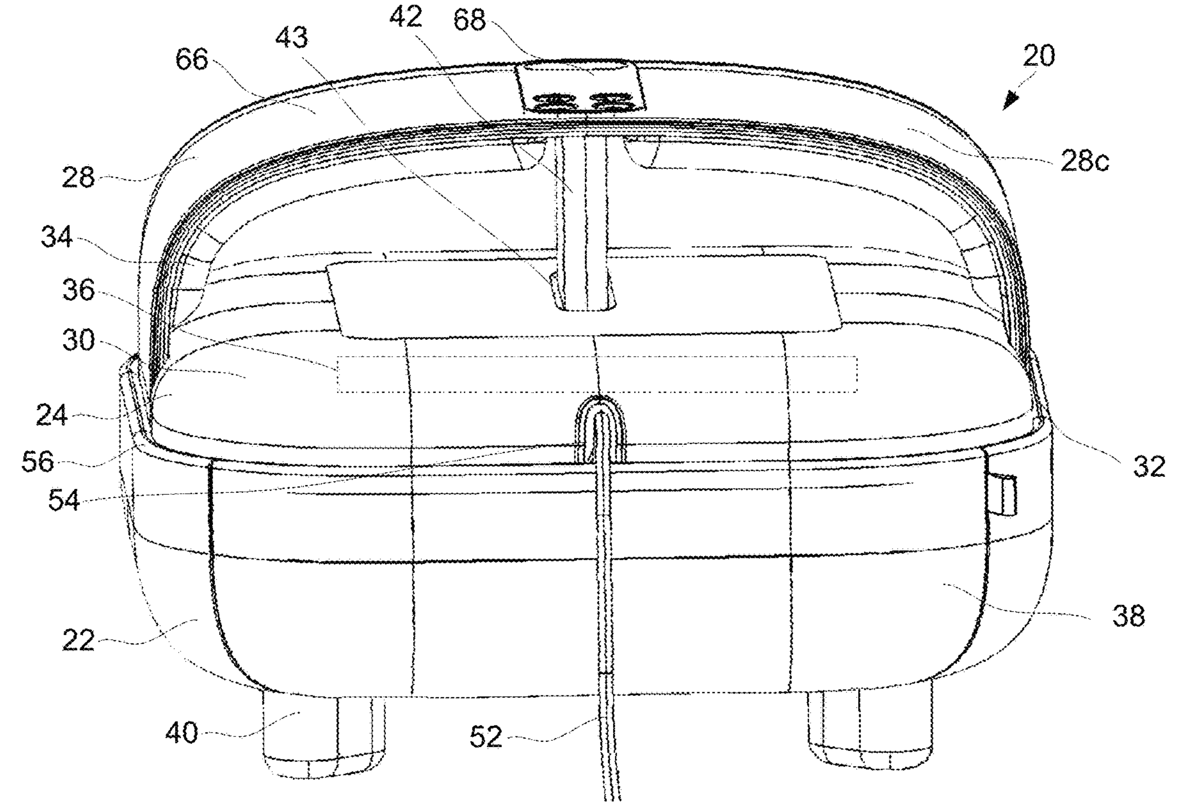
FIG. 3 shows a side view of the ottoman of FIG. 1.

The reversible footrest 24 includes an electrically powered massager 36 that is housed inside the reversible footrest 24, as schematically shown in FIG. 3. In an exemplary embodiment, the reversible footrest 24 may be formed of a shell that surrounds the electrically powered massager 36. The shell is covered with a fabric material, which may be any suitable material. The shell may be formed of any suitable rigid material, such as a polymer material. Other structural materials may be suitable. The reversible footrest 24 may have any suitable shape. For example, the reversible footrest 24 may have a square or rectangular shape. In other exemplary embodiments, the reversible footrest 24 may have a cylindrical shape, or any other polygonal shape. The reversible footrest 24 may have a continuous surface and smooth transitions between surfaces of the reversible footrest 24, such that the reversible footrest 24 does not have any sharp corners. For example, the edges of the first side 30 may curve toward the sidewalls 32. Other shapes of the reversible footrest 24 may be suitable.

The shape of the reversible footrest 24 is complementary to the shape of the support base 22, such that the sidewalls 32 of the reversible footrest 24 mate with the inside of sidewalls 38 of the support base 22 when the reversible footrest 24 is inserted in the support base 22. The sidewalls 38 of the support base 22 and the sidewalls 32 of the reversible footrest 24 extend normal to a surface on which the ottoman 20 is arranged. The support base 22 may be defined by a shell formed of a rigid material and covered with any suitable fabric material. A polymer material or any other structural material may be suitable for the shell. In an exemplary embodiment, a plurality of feet 40 may be attached to a bottom of the support base 22. The feet 40 may have any suitable shape, such as circular, oval, rectangular, etc. Any suitable material may be used to form the feet 40. For example, the feet 40 may be formed of a wood and plastic composite material. Any number of feet may be provided. In other exemplary embodiments, the support base 22 may be formed without feet such that the support base 22 rests directly on the ground on which the ottoman 20 is arranged. In still other embodiments, the ottoman 20 may be formed integrally as part of a couch, sofa, or chair.

The compression band 28 may have an adjustable height relative to the reversible footrest 24 such that the compression band 28 is adjustable for the feet of different users. A center post 42 may extend from the reversible footrest 24 to a middle of the bridge portion 28*c* of the compression band 28. The center post 42 is extendable and retractable through the reversible footrest 24. A suitable shape for the center post 42 is rectangular, but other shapes are suitable. For example, the center post 42 could be cylindrical. More than one center post 42 may be provided in other exemplary embodiments. The compression band 28 may be formed of a semi-rigid material that enables the compression band 28 to be slightly bent when the center post 42 is retracted into the reversible footrest 24. The reversible footrest 24 includes an aperture 43 that extends through the reversible footrest 24. The aperture 43 defines the path of movement for the center post 42 which is configured to move linearly. The center post 42 may be moved automatically or manually by the user. A ratchet mechanism or other mechanical locking mechanism may be arranged in the reversible footrest 24 to lock the center post 42 in position. For example, the center post 42 may be pushed down to the retracted position and the ratchet mechanism may lock the reversible footrest 24 in the retracted position.

Figure 4:
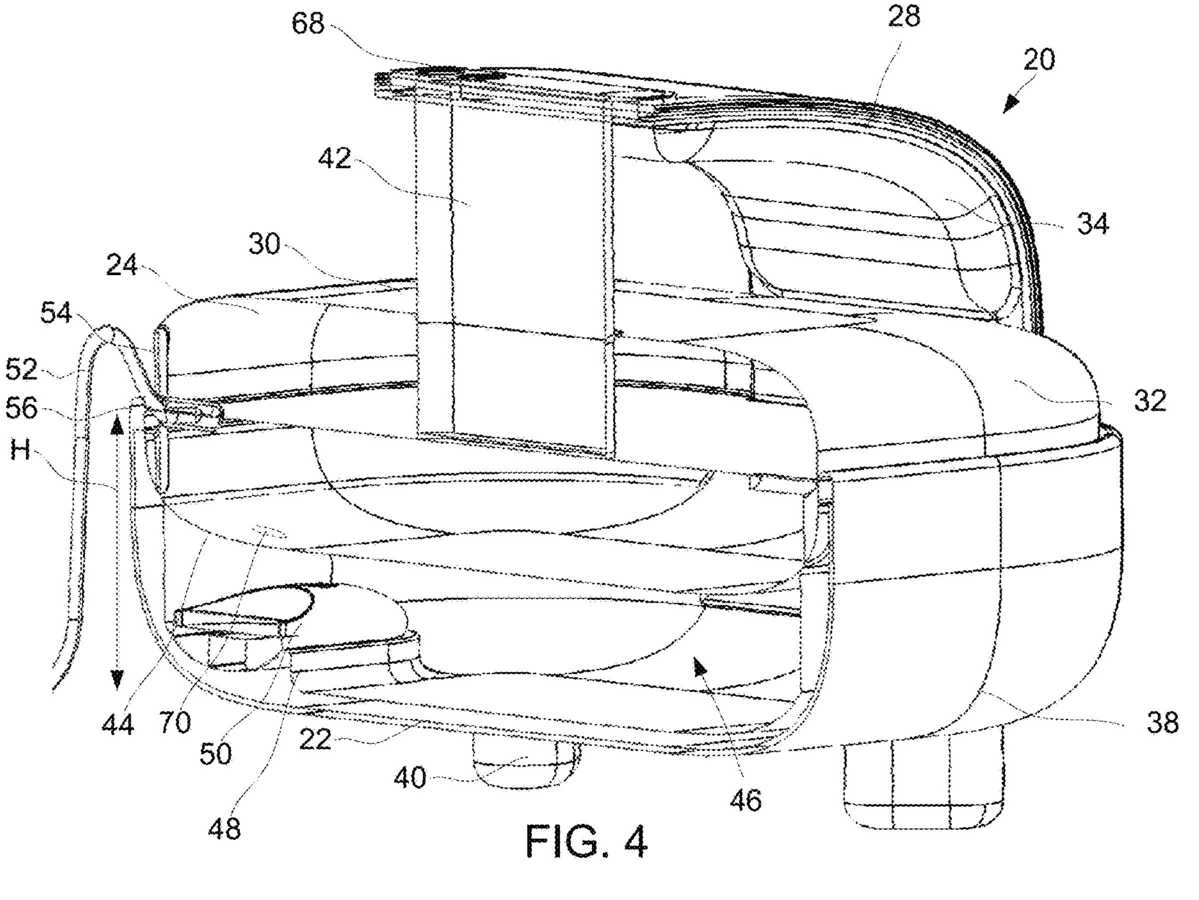
FIG. 4 shows a sectional view of the ottoman of FIG. 1.

As best shown in FIG. 4, the fabric material covering the reversible footrest 24 may be continuous along the entirety of a second side 44 of the reversible footrest 24 that is opposite the first side 30. The first side 30 and the second side 44 may be substantially planar to extend parallel with the ground surface on which the ottoman 20 is arranged. When the reversible footrest 24 is in the first orientation shown in FIGS. 1-4, the second side 44 is a bottom side of the reversible footrest 24. When the reversible footrest 24 is flipped to the second orientation in which the compression band 28 is stowed, the second side 44 is the top side of the reversible footrest 24. When the reversible footrest 24 is in the first orientation, the first side 30 of the reversible footrest 24 is the top side and the compression band 28 is exposed and configured for operation. When the reversible footrest 24 is flipped 180 degrees to the second orientation, the second side 44 of the reversible footrest 24 is exposed. When the reversible footrest 24 is in the second orientation, the electrically powered massager 36 is still operable with the compression band 28 being stowed.

As shown in FIG. 4, the support base 22 defines an interior cavity 46 that is configured to receive at least a portion of the reversible footrest 24. In an exemplary embodiment, approximately half of a height of the reversible footrest 24 may be accommodated in the support base 22 such that approximately half of the reversible footrest 24 is exposed outside the support base 22. The height H of the interior cavity 46 is greater than the height of the center post 42 and the compression band 28 such that the center post 42 can be accommodated in the interior cavity 46 when the reversible footrest 24 is in the second orientation for stowing the compression band 28. When the center post 42 is in the extended position shown in FIG. 4, the portion of the center post 42 extending in the reversible footrest 24 may extend through approximately half of the height of the reversible footrest 24.

In an exemplary embodiment, the height of the compression band 28 when the center post 42 is in the extended position may be between 65 and 85 millimeters. A width of the bridge portion 28*c* of the compression band 28 may be between 125 and 145 millimeters. The width and length of the ottoman 20 may be between 320 and 360 millimeters. In exemplary embodiments, the width and length may be the same. A total height of the ottoman 20 when the reversible footrest 24 is in the first orientation shown in FIGS. 1-4 may be between 220 and 260 millimeters. The feet 40 may have a height that is between 20 and 40 millimeters. Many other dimensions and shapes may be suitable for the ottoman 20 and the ottoman 20 may be sized up or down.

Advantageously, the interior cavity 46 of the support base 22 may be used to store other components of the ottoman 20, or other household items. The support base 22 may define at least one groove 48 that is integrally formed in the support base 22. In an exemplary embodiment, the groove 48 may be formed by a continuous surface of the shell that defines the support base 22. The continuous surface protrudes upwardly from a bottom of the support base 22 and is shaped to accommodate a remote control 50 for the ottoman 20 adjacent the reversible footrest 24. The continuous surface may have a shape that is complementary in shape to the surface of the remote control 50. Accordingly, the remote control 50 can be easily stowed in the interior cavity 46 of the support base 22.

Figure 5:
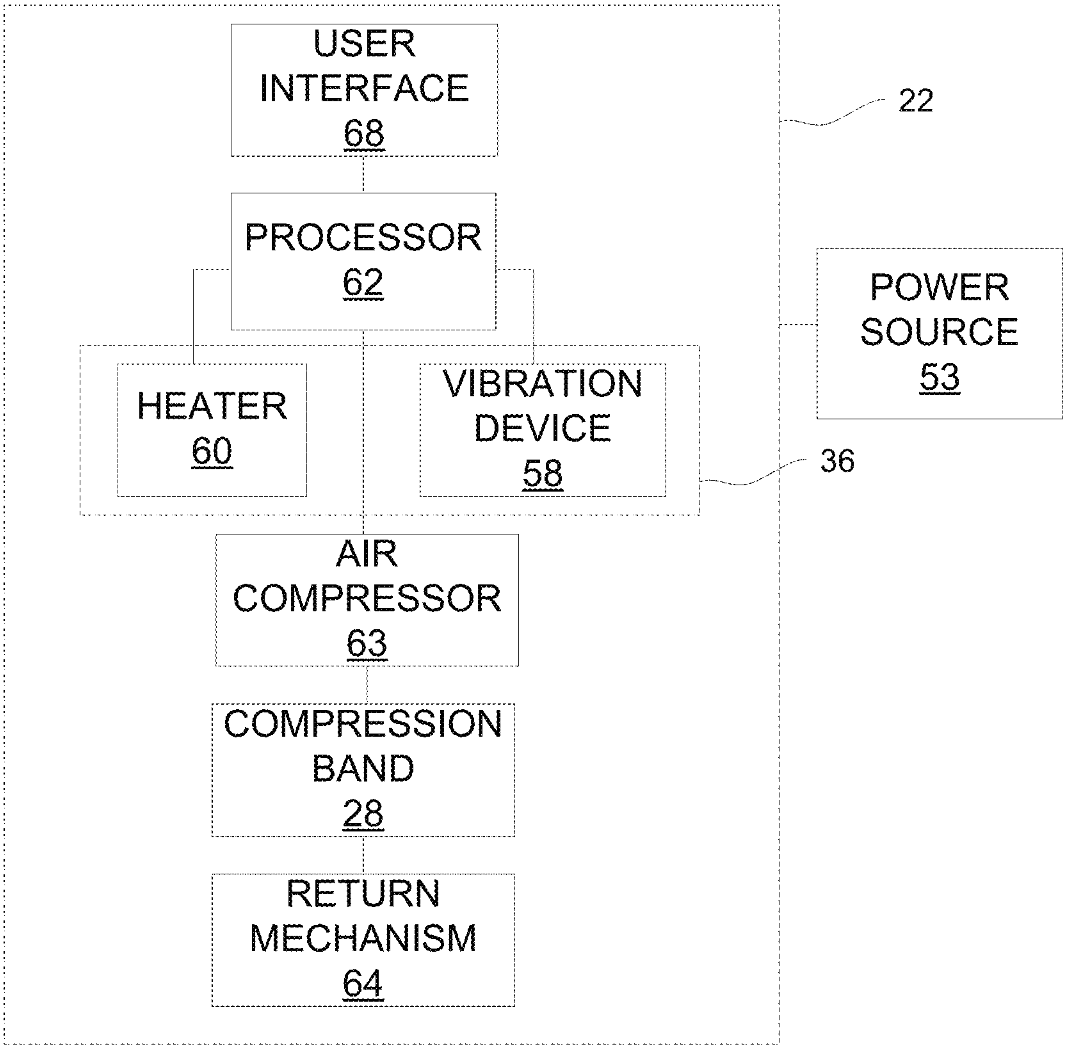
FIG. 5 shows a schematic drawing of a massaging system arranged in the ottoman of FIG. 1.

Referring in addition to FIG. 5, power is supplied to the electrically powered massager 36 via a power connector 52 that may be plugged into a power source 53. In other exemplary embodiments, the power source 53 may be contained in the ottoman 20, such as in a battery which may be chargeable. The power connector 52 may be any suitable cable or a cord. As shown in FIGS. 1, 3, and 4, an elongated through-slot 54 is formed in one of the sidewalls 32 of the reversible footrest 24 for routing the power connector 52 inside the reversible footrest 24 to connect to the electronics of the electrically powered massager 36. The elongated through-slot 54 extends along the entire height of the sidewall 32 from the first side 30 to the second side 44 of the reversible footrest 24. When the reversible footrest 24 is seated in the support base 22, the power connector 52 extends over an upper edge 56 of the support base 22. Providing the elongated through-slot 54 is advantageous in that the power connector 52 can extend out of the reversible footrest 24 when the reversible footrest 24 is in either the first orientation in which the first side 30 of the reversible footrest 24 faces outwardly relative to the support base 22 or in the second orientation in which the second side 44 of the reversible footrest 24 faces outwardly.

As shown in FIG. 5, the electrically powered massager 36 may include a vibration device 58 and a heater 60. The vibration device 58 and heater 60 may be operable when the reversible footrest 24 is in either the first orientation in which the compression band 28 is exposed or in the second orientation in which the compression band 28 is stowed. A processor 62 may be configured to control the vibration device 58, the heater 60, and the compression band 28 in response to a user input. Any suitable processor, circuitry, and other electronic components may be implemented in the reversible footrest 24.

The processor 62 may be in communication with an air compressor 63 that is arranged in the reversible footrest 24 and configured to inflate and deflate the expandable bladder 34 (shown in FIGS. 1, 3, and 4). The center post 42 may be automatically moved in response to a user input received by the processor 62 to adjust the height of the compression band 28. The compression band 28 may also include a return mechanism 64 that is configured to reset the compression band 28 to its tallest height. For example, the return mechanism 64 may include a spring-back mechanism, such that if the center post 42 is pushed to a lowermost position within the reversible footrest 24, i.e. the retracted position, the center post 42 and thus the compression band 28 may be pushed back upwardly out of the reversible footrest 24 to an upper most position, i.e. the extended position.

Any suitable user interface may be provided on the ottoman 20. A user interface may be provided in addition to the remote control 50 (shown in FIG. 4). In other exemplary embodiments, the ottoman 20 may be operable with only the remote control 50 or with only a user interface located on the ottoman 20. A top surface 66 of the bridge portion 28*c* of the compression band 28 may include a user interface 68. The user interface 68 may be arranged at other locations on the ottoman 20 and more than one user interface may be provided. An electronic ink (e-ink) display may be used in the user interface 68. The e-ink display is configured to show various settings and modes of the ottoman 20. Exemplary modes include a vibration mode in which the vibration device 58 is operating, a heat mode in which the heater 60 is operating, and a compression mode in which the compression band 28 is operating. The modes may occur independently or simultaneously.

The user interface 68 may include buttons or any other suitable component configured to receive a command from a user. For example, buttons may be provided for turning components on and off and adjusting operation of the electrically powered massager 36 and the compression band 28, e.g. adjusting the heat of the heater 60 and/or the vibration of the vibration device 58. Buttons may also be provided for controlling inflation of the expandable bladder 34 or the height of the compression band 28. The electrically powered massager 36 may be configured with other massage components besides the heater 60 and the vibration device 58. In other exemplary embodiments, the electrically powered massager 36 may be configured without the heater 60.

The ottoman 20 may also be configured to have other surfaces for easily accommodating the remote control 50. For example, magnetic surfaces or materials may be arranged on the ottoman 20. In an exemplary embodiment, the top surface 66 of the compression band 28 may include a magnet or may be a magnetic surface that is configured to attract a magnet of the remote control 50. Other surfaces of the ottoman 20 may be configured to provide magnetic attraction for the remote control 50. For example, the sidewalls 38 of the support base 22 may include magnetic surfaces.

As shown in FIG. 4, the reversible footrest 24 may include at least one hidden control button 70 that is enclosed by the fabric of the reversible footrest 24 and accessible from outside the reversible footrest 24. For example, the control button 70 may be a power on/off button. Stitching in the fabric surrounding the reversible footrest 24 may be used to indicate the location of the control button 70 inside the reversible footrest 24. The control button 70 may be arranged on the second side 44 of the reversible footrest 24. In other exemplary embodiments, more than one control button 70 may be provided and the control buttons may be positioned anywhere inside the reversible footrest 24.

The ottoman 20 may be formed of any suitable materials and may be formed using any suitable manufacturing and assembly methods. The assembly method may include arranging the electrically powered massager 36 in the reversible footrest 24, attaching the compression band 28 to a top or bottom side 30, 44 of the reversible footrest 24, and removably inserting the reversible footrest 24 into the support base 22.

Figure 6:
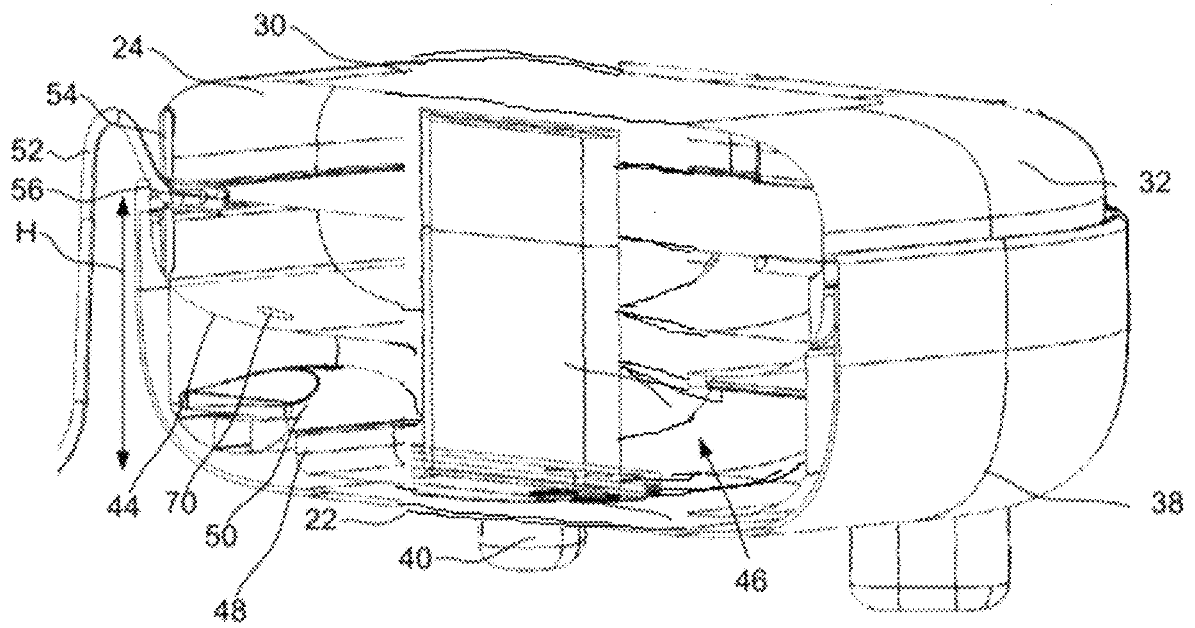
FIG. 6 shows a sectional view of the ottoman of FIG. 1 with the reversible footrest rotated 180 degrees.

As shown in FIG. 6, the reversible footrest 24 can be rotated 180-degrees to the second orientation to stow the compression band. The support base 22 defines an interior cavity 46 that is configured to receive at least a portion of the reversible footrest 24. In an exemplary embodiment, approximately half of a height of the reversible footrest 24 may be accommodated in the support base 22 such that approximately half of the reversible footrest 24 is exposed outside the reversible footrest 24. The height H of the interior cavity 46 is greater than the height of the center post 42 and the compression band 28 such that the center post 42 can be accommodated in the interior cavity 46 when the reversible footrest 24 is in the second orientation for stowing the compression band 28.

An ottoman may include a support base, a reversible footrest that is removably supported in the support base and contains an electrically powered massager, and a compression band that is attached to the reversible footrest and extends over a top or bottom side of the reversible footrest, with the compression band being configured to compress a foot or feet of a user between the compression band and the reversible footrest.

The reversible footrest may have a first orientation in which the compression band is exposed outside the support base and a second orientation in which the compression band is stowed in the support base.

The electrically powered massager may be operable when the reversible footrest is in both the first orientation and the second orientation.

The compression band may include an expandable bladder.

The compression band may have opposite ends attached to opposite sidewalls of the reversible footrest, and a bridge portion that extends between the opposite ends.

The compression band may have an adjustable height relative to the reversible footrest.

The ottoman may include a center post that extends from the reversible footrest to the compression band. The center post may be extendable and retractable through the reversible footrest.

The center post includes a return mechanism that is engaged by the center post when the center post is moved to a fully retracted position to move the center post to an extended position.

The reversible footrest may define an elongated through-slot that extends along a sidewall of the reversible footrest for routing a power connector that is connectable to the foot massager.

The elongated through-slot may extend along the sidewall from the top or bottom side of the reversible footrest to an opposite side of the top or bottom side.

The electrically powered massager may include a heater.

The reversible footrest may include a control button that is enclosed by the reversible footrest and accessible from outside the reversible footrest.

The control button may be arranged on an opposite one of the top or bottom side relative to the top or bottom side of the reversible footrest over which the compression band extends.

The ottoman may include an electronic ink interface arranged on the compression band.

The ottoman may include feet attached to the support base.

The feet may be formed of a composite material including wood and plastic.

The support base may define an interior cavity that is configured to receive at least a portion of the reversible footrest.

The interior cavity may have a height that is greater than a height of the compression band.

The support base may define a groove in the interior cavity, with the groove being configured to support a remote control within the interior cavity adjacent the reversible footrest.

The compression band may include a magnet configured to attract another magnet of a remote control for the ottoman.

A method of assembling an ottoman may include arranging an electrically powered massager in a reversible footrest, attaching a compression band to a top or bottom side of the reversible footrest, with the compression band extending over the top or bottom side of the reversible footrest and being configured to compress a foot or feet of a user between the compression band and the reversible footrest, and removably inserting the reversible footrest into a support base in either a first orientation in which the compression band is exposed outside the support base or a second orientation in which the compression band is stowed in the support base, the electrically powered massager being operable when the reversible footrest is in both the first orientation and in the second orientation.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An ottoman comprising:

a support base;

a reversible footrest having a first side and an opposing second side, the reversible footrest is removably supported in the support base and contains an electrically powered massager; and a compression band that is attached to the reversible footrest and extends over the first side of the reversible footrest, the compression band being configured to compress a foot or feet of a user between the compression band and the reversible footrest, wherein:

the reversible footrest has a first orientation and a second orientation, the first orientation being flipped 180 degrees from the second orientation, the reversible footrest being flipped about any axis parallel to a surface on which the ottoman is arranged, the first side is a top side of the reversible footrest in the first orientation to provide a footrest facing a direction opposite the support base, and the second side is the top side of the reversible footrest in the second orientation to provide a footrest facing the direction opposite the support base.

2. The ottoman according to claim 1, wherein the reversible footrest is in the first orientation, the compression band is exposed outside the support base and when the reversible footrest is in the second orientation, the compression band is stowed in the support base.

3. The ottoman according to claim 1, wherein the electrically powered massager is operable when the reversible footrest is in both the first orientation and in the second orientation.

4. The ottoman according to claim 1, wherein the reversible footrest defines an elongated through-slot that extends along a sidewall of the reversible footrest for routing a power connector that is connectable to the foot massager.

5. The ottoman according to claim 4, wherein the elongated through-slot extends along an entire height of the sidewall from the top or bottom side of the reversible footrest to an opposite side of the top or bottom side.

6. The ottoman according to claim 1, wherein the compression band includes an expandable bladder.

7. The ottoman according to claim 6, wherein the compression band has opposite ends attached to opposite sidewalls of the reversible footrest, and a bridge portion that extends over the top or bottom side of the reversible footrest between the opposite ends.

8. The ottoman according to claim 1, wherein the compression band has an adjustable height relative to the reversible footrest.

9. The ottoman according to claim 8 further comprising a center post that extends from the reversible footrest to the compression band, the center post being extendable and retractable relative to the reversible footrest.

10. The ottoman according to claim 9, wherein the center post includes a return mechanism that is engaged by the center post when the center post is moved to a fully retracted position to move the center post to an extended position.

11. The ottoman according to claim 1, wherein the electrically powered massager includes a heater.

12. The ottoman according to claim 1, wherein the reversible footrest includes a control button that is enclosed by the reversible footrest and accessible from outside the reversible footrest.

13. The ottoman according to claim 12, wherein the control button is arranged on an opposite one of the top or bottom side relative to the top or bottom side of the reversible footrest over which the compression band extends.

14. The ottoman according to claim 1 further comprising an electronic ink interface arranged on the compression band.

15. The ottoman according to claim 1, wherein the support base defines an interior cavity that is configured to receive at least a portion of the reversible footrest.

16. The ottoman according to claim 15, wherein the interior cavity has a height that is greater than a height of the compression band.

17. The ottoman according to claim 15, wherein the interior cavity includes a groove that is formed integrally with the support base and configured to support a remote control within the interior cavity adjacent the reversible footrest.

18. The ottoman according to claim 1, wherein the compression band includes a magnet configured to attract another magnet of a remote control for the ottoman.

19. The ottoman according to claim 1 further comprising feet attached to the support base, wherein the feet are formed of a composite material including wood and plastic.

20. A method of assembling an ottoman, the method comprising:

arranging an electrically powered massager in a reversible footrest having a first side and an opposing second side;

attaching a compression band to the first side of the reversible footrest, wherein the compression band extends over the first side of the reversible footrest and is configured to compress a foot or feet of a user between the compression band and the reversible footrest; and removably inserting the reversible footrest into a support base in either a first orientation in which the compression band is exposed outside the support base or a second orientation in which the compression band is stowed in the support base, the electrically powered massager being operable when the reversible footrest is in both the first orientation and in the second orientation, wherein:

the first orientation being flipped 180 degrees from the second orientation, the reversible footrest being flipped about any axis parallel to a surface on which the ottoman is arranged, the first side is a top side of the reversible footrest in the first orientation to provide a footrest facing a direction opposite the support base, and the second side is the top side of the reversible footrest in the second orientation to provide a footrest facing the direction opposite the support base.

* * * * *